United States Patent
Ma et al.

(10) Patent No.: US 11,071,967 B2
(45) Date of Patent: Jul. 27, 2021

(54) METHOD OF PREPARATION AND APPLICATION OF ION-KEEPER ADSORBENT

(71) Applicant: DALIAN UNIVERSITY OF TECHNOLOGY, Dalian (CN)

(72) Inventors: Wei Ma, Dalian (CN); Shibo Duan, Dalian (CN); Shuangen Yu, Dalian (CN); Fanqing Meng, Dalian (CN); Ren Wang, Dalian (CN); Jun Xu, Dalian (CN); Liyan Guo, Dalian (CN); Lei Wu, Dalian (CN); Zhuo Liu, Dalian (CN); Dazhi Tan, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 709 days.

(21) Appl. No.: 15/776,985

(22) PCT Filed: Mar. 2, 2017

(86) PCT No.: PCT/CN2017/075455
§ 371 (c)(1),
(2) Date: May 17, 2018

(87) PCT Pub. No.: WO2017/162013
PCT Pub. Date: Sep. 28, 2017

(65) Prior Publication Data
US 2018/0339285 A1    Nov. 29, 2018

(30) Foreign Application Priority Data

Mar. 25, 2016 (CN) .......................... 201610179512.8
Nov. 14, 2016 (CN) .......................... 201611020782.0

(51) Int. Cl.
*B01J 20/24* (2006.01)
*C22B 3/24* (2006.01)
(Continued)

(52) U.S. Cl.
CPC .............. *B01J 20/24* (2013.01); *B01J 20/28* (2013.01); *B01J 20/3021* (2013.01);
(Continued)

(58) Field of Classification Search
CPC .. B01J 20/24; B01J 20/28; C22B 3/24; C22B 34/32
See application file for complete search history.

(56) References Cited

U.S. PATENT DOCUMENTS

| 3,803,032 | A | * | 4/1974 | Adachi | ..................... C02F 1/66 |
| | | | | | 210/714 |
| 2004/0124151 | A1 | * | 7/2004 | Licata | ..................... B01J 20/24 |
| | | | | | 210/661 |

(Continued)

*Primary Examiner* — Scott R Kastler
(74) *Attorney, Agent, or Firm* — Muncy, Geissler, Olds & Lowe, P.C.

(57) ABSTRACT

The invention belongs to the field of chemical separation, hydrometallurgy and resource recovery and provides a method for preparing and applying of ion-keeper adsorbent. By adjusting the pH to selective oxidation to achieve the oxidation of ferrous iron into ferric iron. Separates the iron after the hydrothermal reaction; By using of ion imprint "ion keeper" effect and biomass as raw materials, to prepare the adsorbent with internal rules, hierarchical pores and high selectivity. It can be used for deep purification of chromium solution, such as iron, aluminum, vanadium and other impurities in the solution; After the deep purification of chromium solution, then adjusting the pH, adding appropriate hydrating agent, by hydrothermal precipitation treatment of chrome, filtration, acid washing and calcination to obtain chromium oxide crystal. It achieves the purification of chromium, iron, aluminum and chromium. The recycling and comprehensive utilization of waste resources are also realized. The process is simple, the iron, aluminum, vanadium and other impurities are in the selective adsorption. Chromium solution after deep purification can be processed (Continued)

for high purity chromium products to provide technical support.

7 Claims, 4 Drawing Sheets

(51) Int. Cl.
    *C22B 34/32*     (2006.01)
    *B01J 20/30*     (2006.01)
    *B01J 20/28*     (2006.01)

(52) U.S. Cl.
    CPC ............. B01J 20/3085 (2013.01); C22B 3/24 (2013.01); C22B 34/32 (2013.01); *B01J 2220/4843* (2013.01); *Y02P 10/20* (2015.11)

(56) References Cited

U.S. PATENT DOCUMENTS

| | | | |
|---|---|---|---|
| 2008/0277351 A1* | 11/2008 | Harman | C02F 1/286 210/691 |
| 2018/0237321 A1* | 8/2018 | Sun | E21C 41/32 |
| 2018/0339285 A1* | 11/2018 | Ma | B01J 20/24 |

* cited by examiner

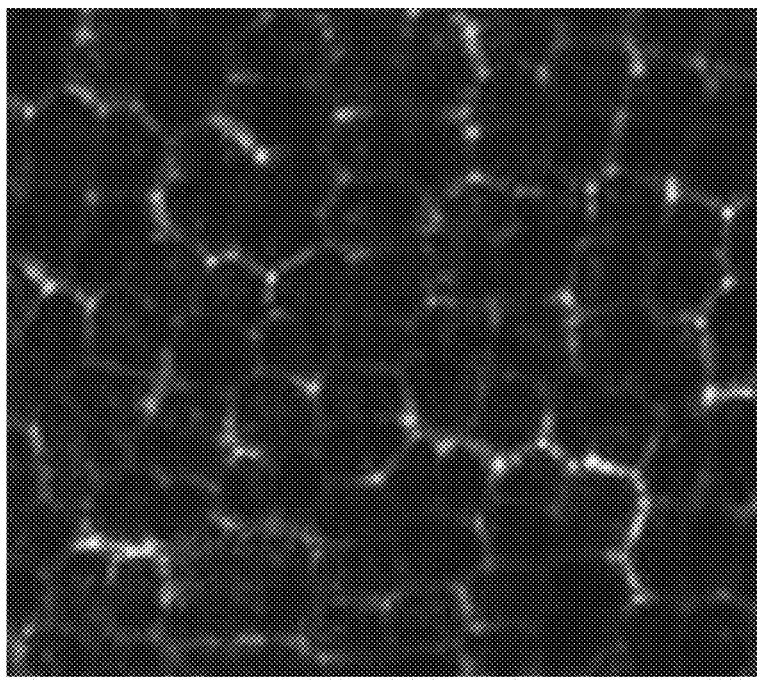
Fig.1( Fig.1 as an illustration in Abstract)
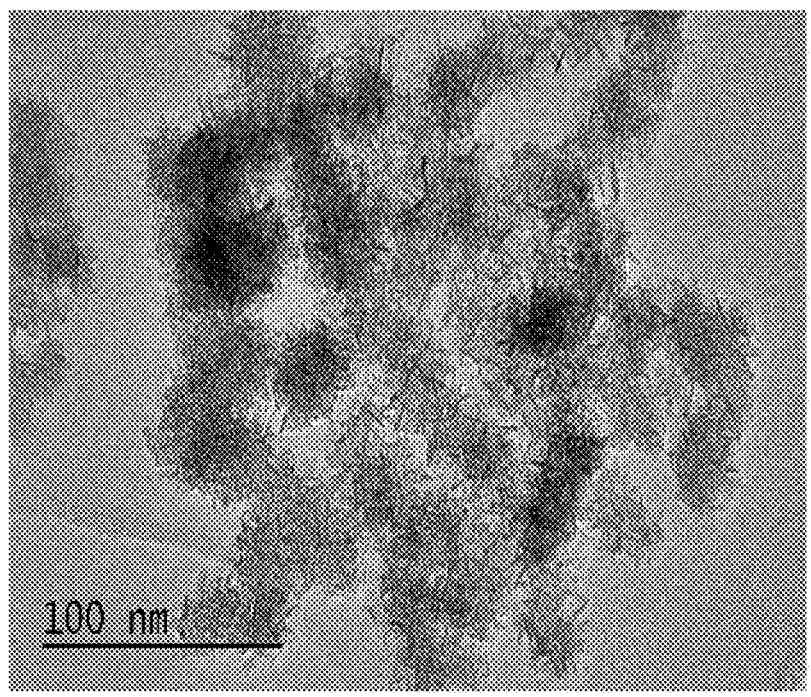
Fig.2

METHOD OF PREPARATION AND APPLICATION OF ION-KEEPER ADSORBENT

TECHNICAL FIELD

The present invention belongs to the field of chemical separation, hydrometallurgy and resource recovery, and more particularly relates to the use of chrome ore, chromium residue and chemical, metallurgical process of chromium by-products and intermediates detoxification and recovery of the preparation of a variety of uses of chromium compounds, nano-scale chromium oxide treatment.

BACKGROUND

Chromium metal has a high boiling and melting point, hardness, corrosion resistance and other characteristics. Chromium trioxide is a widely used multipurpose product in chemical, refractory materials, metal materials and other fields. Currently, the company of sodium bichromate production, discharged a considerable chromium by-product due to the large amount of waste generated by improper handing, which contains hexavalent chromium, a serious harm to human health and it has high water solubility. The environment will be polluted seriously in the process of pile due to the reasons for rain wash. While trivalent chromium has a lower toxicity compared with hexavalent chromium. The current commonly hexavalent chromium residue detoxification process is turn the hexavalent chromium into trivalent chromium and recovery. As the chromium slag contains some impurities such as iron, aluminum, vanadium and so on, the presence of these impurities affects the purity and quality of the final chromium product. Therefore, reducing the amount of impurities in the chromium slag dissolution means a lot for deeply purification of chromium solution and the quality improving of chromium products.

For the separation of chromium and other metal elements, such as the separation of chromium and iron. Wu Jianhui et al. proposed a method to use sulfuric acid to leach ferrochrome alloy and then separate iron by Mohr salt crystallization in the study of chromium and iron separation in 2011 "Hydrometallurgy" Volume 30, No. 1. The loss rate of chromium was 1.85%. But the optimum pH is 0.5, the acidity of the reaction vessel is higher. In 2014, Zhang Bo et al. pointed out that sodium jarosite process can be selected for the separation of trivalent chromium and ferric iron in the chromite sulfuric acid leachate in the "non-ferrous metals (smelting part)" No. 7. The removal rate of iron is nearly 100%, and vanadium loss rate is less than 7%. But its pH requirements at −0.87, demanding and corrosive to the container. Xu Zhifeng et al. in "Nonferrous Metals Science and Engineering" published papers pointed out that the solution of chromium, iron ions can be separated by phosphate precipitation method, the final solution after the concentration of chromium can be reduced to 0.04 g/L or so. The iron content in the sediment was reduced to 0.4%. After the initial chrome iron separation, chromium will contain a small amount of iron and other metal elements, and ultimately will affect the quality of chromium products. In view of the separation of chromium and aluminum, Wei Guangye et al. reported the progress of aluminum removal in chrome salt production process in the Journal of Chinese Nonferrous Metals, Vol. 23, No. 6, page 1712. The methods of aluminum removal are reviewed in this paper, and the development direction of aluminum removal method was discussed. Lin Sheng, etc. proposed the method for recovering alumina and sodium chromate from the slag obtained by the production of metallic chromium from aluminum thermal method by fused alkali-roasting-water immersion-carbonation decomposition-concentrated crystallization process in the fourth period in 2014, "Mining and Metallurgical Engineering" "recovery of chromium and aluminum technology research from the chrome slag by aluminum thermal process preparation of chromium" in the paper. The effects of chromium particle size, alkali residue ratio, calcination time and temperature on the leaching rate of chromium and aluminum were discussed. The leaching rate of chromium and aluminum increased with the increase of alkali residue ratio, calcination time and calcination temperature, and the optimum extraction conditions were as follows: calcination temperature 700° C., calcination time 4 h, particle size 0.045 mm and alkali ore ratio of 6:1. The purity of the obtained chromium salt (with sodium dichromate) and alumina was 88.5% and 95.4%, respectively, and the total recoveries were 85.6% and 96.4% respectively. Sodium was recovered in the form of sodium carbonate and sodium bicarbonate.

For chromium, vanadium separation problems, in 2014, Li hongyi et al. reported an anion exchange resin selective adsorption of vanadium to separate and extract vanadium and chromium in "Iron and Vanadium Titanium" NO. 3 page 55. The mechanism of the adsorption of vanadium by the resin was described and the separation principle of vanadium and chromium. But the process in the resin transformation may produce a lot of waste water. Disclosed is CN 103773956A, it has been proposed to separate vanadium from vanadium and chromium solutions by reduction-precipitation-calcination-dissolution, and to produce chromium oxide and vanadium pentoxide products, but the process is too long, cumbersome operation. Disclosed is CN 102925686A proposes a method for the selective separation and extraction of vanadium and chromium from a vanadium-containing and chromium-containing solution to achieve efficient separation and high purity extraction of vanadium and chromium, but this process is applied to ion exchange resin, need to use detergent to remain in the exchange column of chromium washed down, the process is more cumbersome.

The purification process of the above chromium solution is mainly based on chemical precipitation and ion exchange. In view of the behavior of biomass adsorption of chromium and purification of chromium, Wang et al., reported the preparation of adsorbents and their removal of hexavalent chromium applied research in "Chemical Engineering Journal"174, pp. 326-332. Hu Ying et al. reviewed the progress of adsorption of chromium-containing wastewater from plant waste in the "Safety and Environmental Engineering" Volume 23, Issue 1, 2016. It pointed out that the biomass adsorbent is rich in its source and has strong ability to remove chromium after modification. In 2016, Johansson et al. published a paper on the removal of selenium, arsenic and molybdenum in solutions by modified seaweed-based biomass adsorbent in the Journal of Environment Management, Vol. 165, No. 1.

Since the biomass-based adsorbents have a large number of functional groups that can adsorb heavy metal ions, they can remove multiple metal contaminants in the water, but they are less selective in the presence of multiple metals, and there are few reports on this. At present, the biomass-based adsorbent does not involve the "ion-controlled" effect, that is, in the adsorption of impurity ions at the same time the target ion keeper control. Thus, the present invention provides an adsorbent for the preparation of a chrome blocking effect by the hydrothermal application of the biomass in the deep ionization of the chromium solution have a certain practical significance in a variety of ion coexisting systems. After the purification of chromium solution, it can be used as raw materials to prepare high-quality chromium oxide products, the current method has not been reported.

SUMMARY

The object of the present invention is to overcome the above-mentioned deficiencies and to provide a method for the reduction of impurities such as iron, aluminum and vanadium by means of a method for reducing vanadium by using a hydrothermal reduction atmosphere to reduce hexavalent chromium or a method for suppressing the generation of hexavalent chromium. The main feature is extract chromium by controlling hexavalent chromium pollution process or the first residue in the hexavalent chromium to trivalent chromium after separation. By adjusting the pH selective oxidation to achieve only the purpose of oxidation of ferrous iron into ferric iron, the separation of iron can be obtained after hydrothermal reaction. A high selectivity adsorbent with internal rules and multi-stage structure was prepared by using biomass such as large seaweed, orange peel and straw as raw materials, it can be used in the depth of purification to the iron, aluminum, vanadium and other impurities. The deeply purification of chromium solution can get chromium oxide crystal by adjusting the pH, adding appropriate hydrating agent, hydrothermal precipitation chrome treatment, filtration, acid washing and roasting. This achieves the separation of chromium, iron, aluminum and vanadium, purification and recycling of chromium, and recycling of waste resources. The process is simple, the iron, aluminum, vanadium and other impurities is in the selective adsorption. The chromium solution after deeply purification can be processed provide technical support for high purity chromium products. Besides, the process is easy to control, it has less waste water emissions, environmental protection and other advantages. The Present Invention has the Following Technical Solution:

The preparation method of ion-keeper adsorbent comprises the following steps:

(1) A concentration of 0.1~1.5 mol/L chromate solution was prepared, and the pH was adjusted to from 2 to 6;

(2) The biomass was washed and crushed, biomass potassium chromate mixture was obtained by adding the crushed biomass to the chromate solution for 2 to 36 hours at a temperature of 30 to 70° C.; The mass ratio of matter to chromate solution is 1:2~8;

(3) The biomass chromate mixture obtained in step (2) was transferred into a reaction kettle, it was aged for 2 to 8 hours at a temperature of 120 to 220° C. to obtain a chromium-controlling adsorbent;

A Method for the Preparation of Ion-Keeper Adsorbents was as Follows:

(1) The chromium-containing solid or chromium-containing solution was acid-soluble, and the pH was adjusted to 0.5 to 4.5, and the insoluble material was filtered to obtain the chromium liquid 1; The insoluble solid residue obtained by filtration should be pickled to chromium content in line with national environmental protection standards, the acid used in the above process can be reused.

(2) First, the pH of the chromium liquid 1 obtained by adjusting the step (1) was adjusted to 0.5 to 6.0, the reducing agent was added, and the pH was adjusted to 1.0 to 5.0 to obtain a chromium-iron solution; Then, an oxidizing agent was added to the separated chrome iron qualified liquid to obtain a mixed solution of ferric iron, trivalent chromium and trivalent aluminum; Finally, the mixed solution was subjected to hydrothermal reaction, and the reaction was accompanied by constant stirring. After the reaction is finished, the filtrate was adjusted to 0.5 to 3.5, and the chromium storage liquid was obtained. The reaction was carried out at a temperature of 50 to 150° C. and a pressure of 0.5 Mpa to 2.5 Mpa for 0.5 to 10 hours.

(3) Sinking chrome qualified liquid 3 was gotten by shock or stirring the mixture of the ion-controlled adsorbent and the chromium liquid 2 in accordance with the mass ratio of 1:150~500 for 5~24 hours, which could add the ionically retarding adsorbent to the chromium liquid 2 obtained in the step (2) or pass the chromium liquid 2 through a fixed bed equipped with an ionically retarded adsorbent;

(4) High temperature hydrothermal: the chrome qualified liquid 3 and hydrating agent was placed in a closed reactor hydrothermal reaction, heated to 150~400° C., the pressure of 0.5 Mpa~4.5 Mpa, insulation 1 to 5 hours, the reaction product was filtered, washed with acidic liquid and dried to obtain green filter cake, which was high purity chromium compound, calcined at 500~1200° C. and transformed into nano-chromium oxide solid.

Wherein the biomass was one or more of the kelp, the straw, the sawdust, the leaf, the peel or one or two of the above mixture;

The reducing agent may be methanol, ethanol, straw or the like;

The oxidizing agent was selected from the group consisting of oxygen, air, hydrogen peroxide, ozone or sulfuric acid radicals.

The chromate solution may be potassium chromate or sodium chromate; The hydrating agent may be an organic substance such as oxalic acid, cellulose, methanol, formaldehyde, formic acid, ethanol or glucose;

The vanadium, aluminum, iron, magnesium and other ions in the precipitated chromium qualified liquid 3 could level up to ppb level after adsorption purification.

In the above process, the washing liquid can be reused or recovered after recovering sodium sulfate.

The method has the advantages that the adsorbent having the chrome ion keeper effect can be prepared, and the adsorption and separation effect of the resistive adsorbent is good, and after the purified chromium solution, a high purity chromium compound can be prepared. The process is simple and environment friendly, reducing the emission of "three waste".

DESCRIPTION OF THE DRAWINGS

FIG. 1 400-fold photomicrograph of the chromium-controlled adsorbent prepared in accordance with the present invention.

FIG. 2 Cross-sectional view of the microparticle of the adsorbent prepared by the present invention.

DETAILED DESCRIPTION

Figure 3:
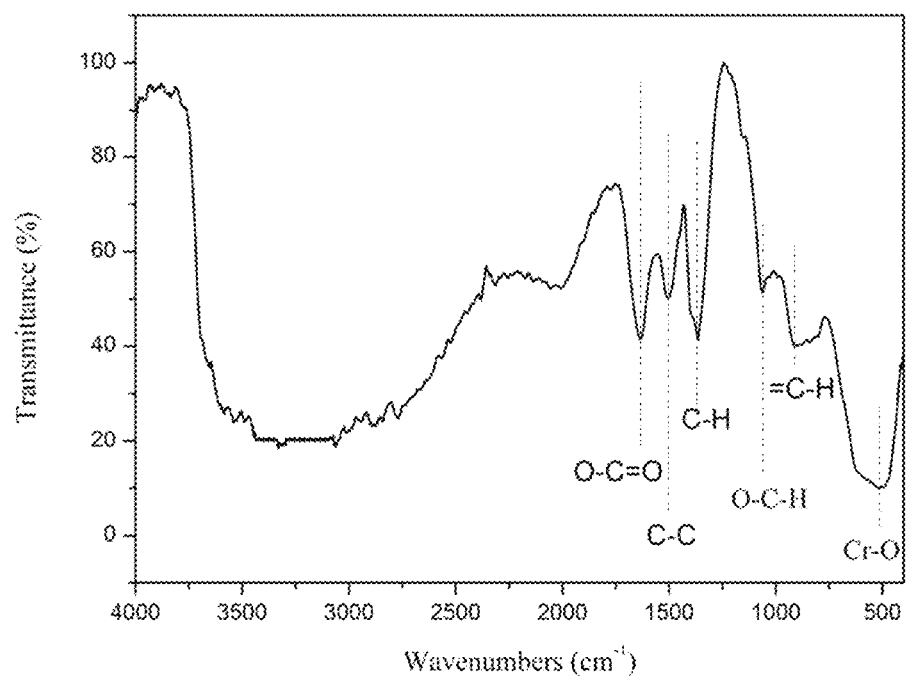
FIG. 3 The infrared spectrum of the chrome-controlled adsorbent.
Figure 4:
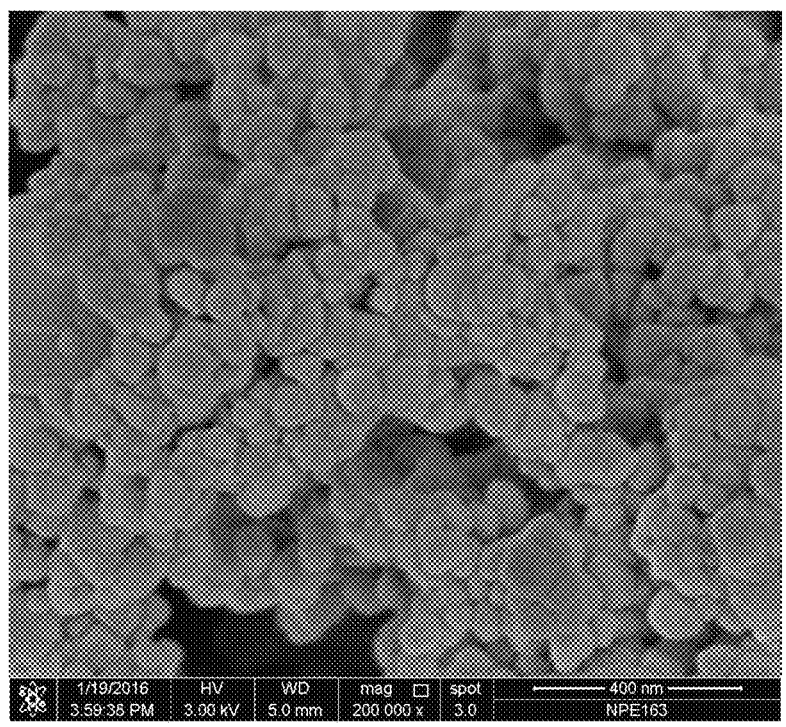
FIG. 4 The chromatogram of chromium oxide obtained by calcination of the chromium-containing compound.
Figure 5:
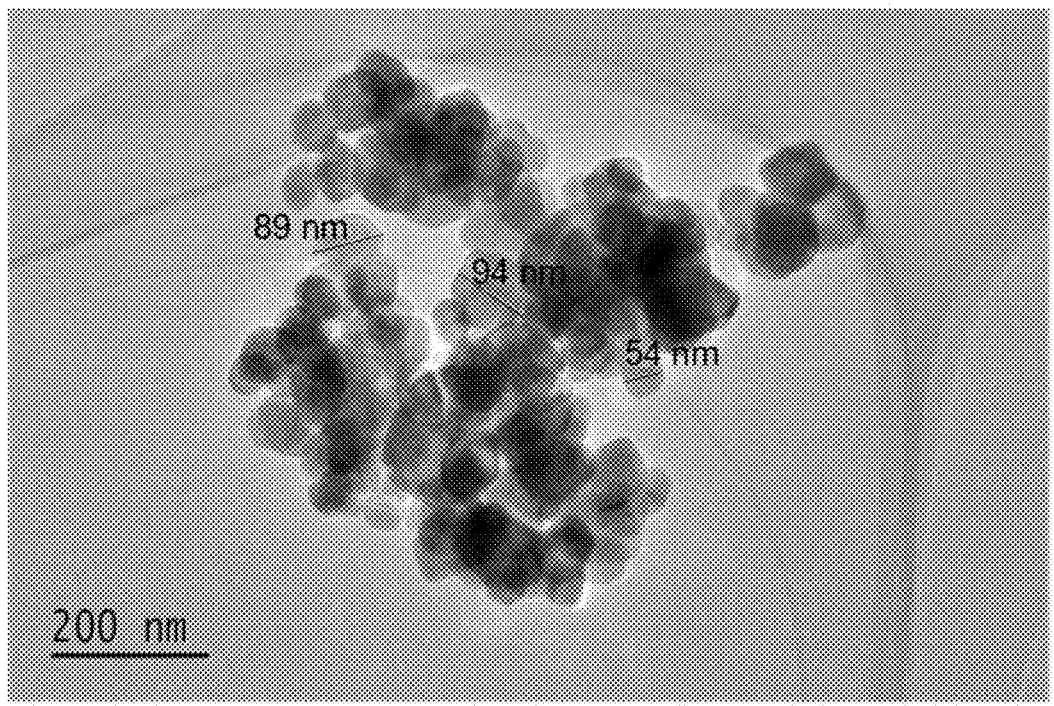
FIG. 5 The TEM of the chromium oxide obtained by calcination of the chromium-containing compound.
Figure 6:
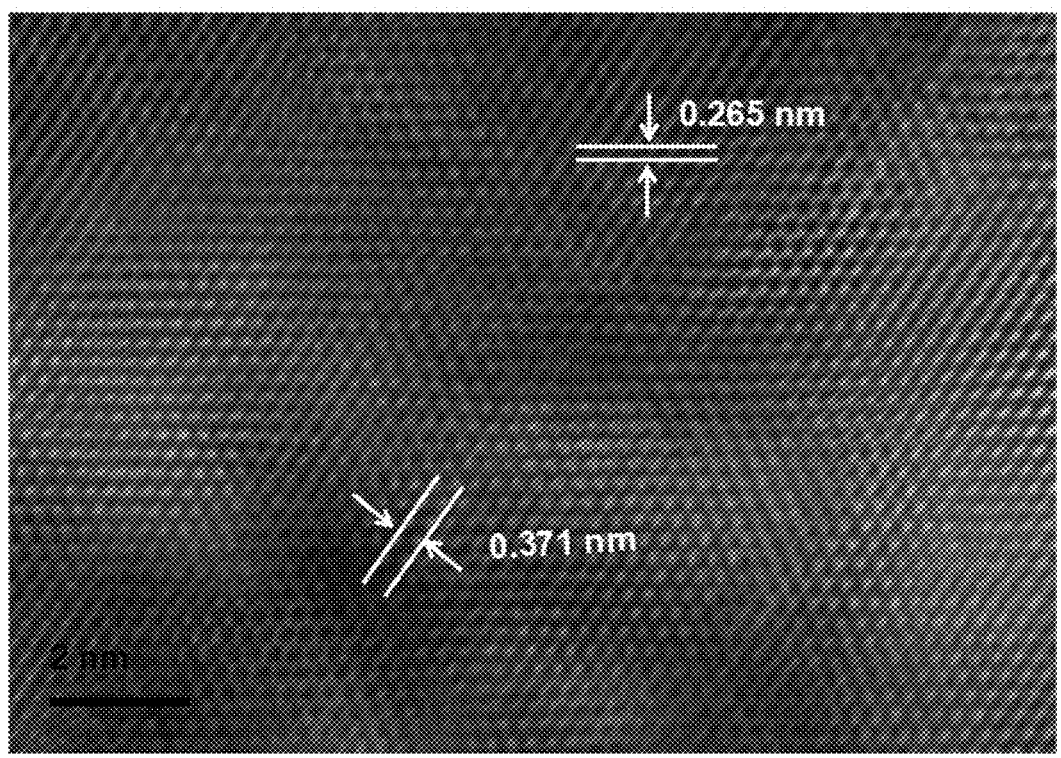
FIG. 6 The HRTEM of the chromium oxide obtained after calcination of the chromium-containing compound.
Figure 7:
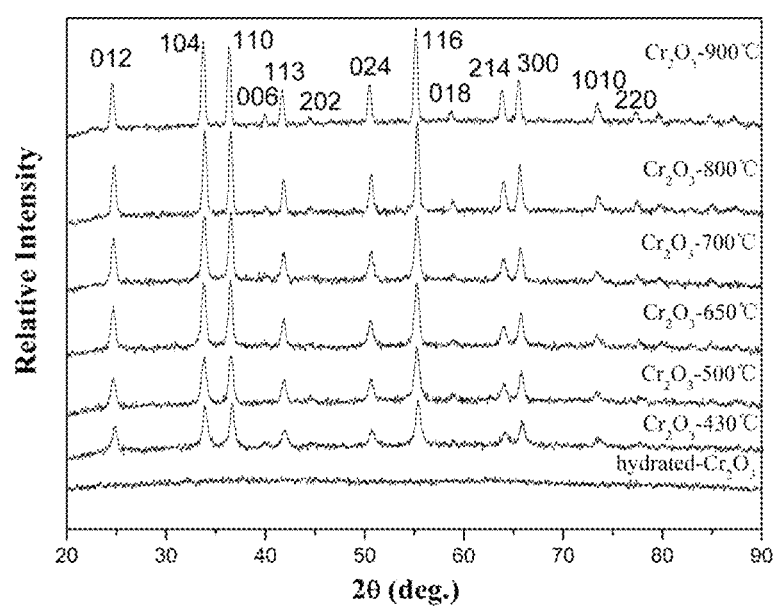
FIG. 7 The XRD patterns of chromium oxide obtained after calcination of the chromium-containing compound.

Specific embodiments of the present invention are described in further detail with reference to the technical solutions and the accompanying drawings, but the invention is not limited to the specific embodiments.

Implementation Example 1

High carbon ferrochrome as raw material, and the ingredients are as follows:

TABLE 1 high carbon ferrochromium composition

| | Ingredients | | | | | |
|---|---|---|---|---|---|---|
| | Cr | C | Si | P | S | Fe and others |
| Content | 42~47 | 6~10 | 3~4 | 0.03~0.04 | 0.02~0.05 | 38~41 |

15.0 g of high carbon ferrochrome was dissolved in 35 ml volume fraction of 60% sulfuric acid solution, then water bath heated to 80° C., constant temperature 30 min to fully respond. And then it was cooled to room temperature, a small amount of insoluble matter was filtered to obtain a mixed solution filtrate 1 containing chromium, iron and other impurities, diluted 10 times, and adjusted to pH 2.8 with sulfuric acid at a mass fraction of 5%. In the filtrate 1 by adding 0.5 ml of methanol, it was hydrothermaled at 160° C. reduction 4 h to turn all the hexavalent chromium into trivalent chromium, then filtration. 10 ml of this filtrate was taken and added 2 ml of hydrogen peroxide with 20% mass fraction, stirred for 30 min, then placed in 18 ml auticlave, incubated at 90° C. for 2 hours, cooled to room temperature and filtered to get Fe sediment and green chromium filtrate 2.

Some washed and dried kelp was broken into about 5 cm² pieces with scissors. 50 g kelp pieces was weighed and immersed in 150 ml 0.4 mol/L potassium chromate solution, placed in 80° C. oven for 8 hours. The mixture was transferred to an autoclave and aged at 210° C. for 5 hours. After completion of the reaction, the resulting solid adsorbent sample was washed with hydrochloric acid, filtered, washed with deionized water and dried at 80° C. for 24 hours (the adsorbent was shown in FIG. 1 to 3).

The concentration of chromium (VI) and iron (III) in the mixture was 120.95 mg/L and 16.91 mg/L, respectively, then adding 1 g of adsorbent to 500 ml of chromium filtrate 2. After stirring for 2 hours, the adsorbent was separated by filtration, and the content of iron (III) in the solution was detected. Then, 1 g of adsorbent was added to the solution, and the mixture was stirred for 12 hours. The purified chromium liquid 3 was obtained. Iron (III) concentration, the results are as follows:

| | Inicial concentration (mg/L) | After 18 h concentration (mg/L) | After 24 h concentration (mg/L) | Removal rate (%) |
|---|---|---|---|---|
| Cr | 120.95 | — | — | — |
| Fe | 16.91 | 0.175 | 0.042 | 99.75 |

15 ml of chromium solution 3 was taken and added 1.5 ml of methanol, with the mass fraction of 5% sulfuric acid to adjust the pH to 2.1, placed in a 18 ml autoclave, heated at 210° C. for 1.5 hours, cooled to the room temperature, washed with water, dried at 120° C. for 2 hours and calcined at 600° C. for 3.5 hours to obtain green chromium oxide crystals (product shown in FIGS. 4 to 7).

Implementation Example 2

The chromium aluminum slag as the raw material.

TABLE 2

The ingredients of chromium aluminum slag

| Ingredient | Cr | Al | Si | P | S | Others |
|---|---|---|---|---|---|---|
| Content | 62~67 | 18~25 | 3~4 | 0.03~0.04 | 0.02~0.05 | 3~5 |

100.0 g chrome aluminum slag was taken and dissolved in 300 ml volume fraction 13% sulfuric acid solution, heated for 35 min to make chrome aluminum slag reaction completely. The material after the reaction was filtered to obtain a chromium-aluminum mixed solution. 200 ml of filtrate 1 was taken and added 1.0 ml of methanol, then hydrothermaled reduction in 160° C. for 4 hours to turn all the hexavalent chromium into trivalent chromium, filtered to get chrome aluminum mixture 2.

The orange peel was washed and crushed into about 1 cm2 pieces. 30 g of orange peel was weighed and immersed in potassium chromate solution in a 50° C. oven for 2 hours. After completion of the reaction, the obtained chromium-resistant adsorbent sample was washed with hydrochloric acid, washed with deionized water and dried at 80° C. for 24 hours.

2 g of chrome-resistant adsorbent was added to 100 ml, pH 3.05 chrome-aluminum mixture 2, shaken in the shaker for 26 hours. The mixture was centrifuged and the supernatant was taken for measuring aluminum contents. The results are as follows:

| | Initial concentration (mg/L) | After 18 h concentration (mg/L) | Removal rate (%) |
|---|---|---|---|
| Cr | 105.20 | — | — |
| Al | 6.17 | 0.037 | 99.40 |

20 ml supernatant was taken and added 1.0 ml of ethanol, adjusted the pH to 1.9, and added to a 18 ml of closed reactor, heated in 140° C. for 2 hours and calcined at 450° C. for 2.5 hours to obtain chromium oxide crystals.

The filtrate and the washing solution were adjusted to pH 8 to obtain a white precipitate, filtered, washed with deionized water, dried and calcined at 300° C. for 2.5 hours to obtain an alumina solid. The filtrate and the washing liquid were repeated during the above process.

Implementation Example 3

The chrome ore as the starting material

TABLE 3

Chromium Ingredients

| Ingredients | Cr | Fe | Al | Mg | Ca | Others |
|---|---|---|---|---|---|---|
| Content | 18~26 | 15~24 | 9~13 | 8~12 | 3~5 | 14~16 |

15.0 g chrome ore was dissolved in 50 ml volume fraction of 45% sulfuric acid solution, then water bath heated in 80° C., constant the temperature for 30 min to make sure the chrome ore was fully reacted. And then cooled to room temperature, a small amount of insoluble matter was filtered to obtain a mixed filtrate containing chromium, iron and other impurities. The mixture was diluted to 10 times and adjusted the pH to 2.5 with sulfuric acid at a mass fraction of 5%. 0.5 ml of methanol was added to the filtrate 1 to hydrothermal 160° C. reduction for 4 hours to turn all the hexavalent chromium into trivalent chromium, containing trivalent chromium solution. 2 ml of hydrogen peroxide with 20% mass fraction was added to 10 ml of the above trivalent chromium solution and stirred for 30 min, then placed in a 18 ml autoclave, incubated at 90° C. for 2 hours, cooled to room temperature and filtered to obtain Fe-containing sediment and green chromium filtrate 2.

10 g of crushed pineapple skin was soaked in 50 ml 0.25 mol/L sodium chromate solution, placed in 60° C. oven for 2 hours. The mixture was transferred to an autoclave and aged at 150° C. for 3 hours. After completion of the reaction, the obtained solid chromium-resistant adsorbent sample was pickled, filtered, and dried at 80° C. for 24 hours. 1 g of the chrome-controlled adsorbent was added 20 ml of the filtrate 2 to be deeply purified, and then mixed for 12 hours after stirring to obtain the chromium filtrate 3.12 ml of filtrate 3 was added 0.2 ml of methanol, adjusted the pH to 2.15, and then added to a 25 ml closed reactor, heated in 160° C. for 4 hours. After completion of the reaction, the mixture was cooled to room temperature and filtered. The resulting solid was dried at 120° C. for 4 hours and calcined at 500° C. for 2.5 hours to obtain nano-chromium oxide.

Implementation Example 4

The straw was washed, dried and broken into pieces with scissors. 50 g of straw was weighed and immersed in 100 ml of 0.3 mol/L potassium chromate solution and immersed in a 50° C. oven for 2 hours. The mixture was transferred to an autoclave and aged at 180° C. for 2 hours. After completion of the reaction, the obtained solid sample was pickled, filtered, and dried at 80° C. for 24 hours.

The concentration of vanadium (V) and chromium (VI) in the mixed solution was 9.803 mg/L and 88.79 mg/L, respectively, in the mixture of 0.5 g adsorbent and 150 ml and pH value of 8.15. Vanadium and chromium (V) and chromium (VI) in the solution were analyzed. The adsorption capacity of adsorbent to vanadium (V) and chromium (VI) was calculated. The results were as follows:

|  | Initial concentration (mg/L) | Concentration after 4 h (mg/L) | Adsorption capacity (mg/g) | Removal rate (%) | Initial Cr/V concentration ratio | 4 h after Cr/V concentration ratio |
|---|---|---|---|---|---|---|
| V | 9.803 | 0.035 | 2.93 | 99.64 | 9:1 | 2549:1 |
| Cr | 88.79 | 89.23 | — | — |  |  |

5.0 ml of methanol was added to 300 ml supernatant, the pH was adjusted to 2.30, and the mixture was added to a 500 ml closed reactor, heated in 150° C. for 3.5 hours. After completion of the reaction, the mixture was cooled to room temperature and filtered. The resulting solid was dried at 110° C. for 2 hours and calcined at 500° C. for 2.5 hours to obtain chromium oxide crystals.

We claim:

1. A preparation method of ion-keeper adsorbent, comprising:
   (1) providing a chromate solution having a concentration of 0.1~1.5 mol/L, wherein the pH of the chromate solution is adjusted to 2~6;
   (2) washing, breaking and soaking a biomass in the chromate solution for 2~36 h to obtain a mixture of biomass chromate; a mass ratio of mass the biomass to the chromate solution is 1: 2~8;
   (3) transferring the biomass chromate mixture obtained in step (2) into a reaction kettle and aged-aging for 2~8 hours at a temperature of 120 to 220° C. to obtain a chromium-keeper adsorbent, which is ion-keeper adsorbent.

2. The preparation method claim 1, wherein the biomass is one or more of a kelp, a straw, a sawdust, a leaf or a peel.

3. An application method of the ion-keeper obtained in the preparation method of claim 1, comprising:
   (1) dissolving a chromium-containing solid or chromium-containing solution in an acid solution, and a pH is adjusted to 0.5~4.5, an insoluble material is filtered to obtain a chromium liquid 1; pickling the insoluble material obtained by filtration until the chromium content in line with the national environmental protection standard;
   (2) a pH of the chromium liquid 1 obtained in the step (1) is adjusted to 0.5~6.0, adding a reducing agent, and the pH is adjusted to 1.0~5.0, obtaining a separated ferrochrome qualified liquid; adding oxidant to obtain a mixed solution of trivalent iron, trivalent chromium and trivalent aluminum; the mixed solution is subjected to hydrothermal reaction, and the reaction is accompanied by constant stirring; after the reaction is finished, a filtrate and Fe-containing sediment are obtained; the pH of filtrate is adjusted to 0.5 to 3.5 and a chrome storage solution is gotten, that is chromium liquid 2; hydrothermal conditions are in the range of 50~150° C. and 0.5Mpa~2.5 Mpa for 0.5~10 hours;
   (3) adding the ion keeper adsorbent to the chromium liquid 2 obtained in the step (2) or passing the chromium liquid 2 through a fixed bed equipped with the ion-keeper adsorbent; a ratio of the ion-keeper adsorbent and the chromium liquid 2 is 1:150~500 and then shock or stirring 5~24 hours, get sinking a chrome qualified liquid 3;
   (4) high temperature hydrothermal: the chrome qualified liquid 3 and hydrating agent is placed in a closed reactor hydrothermal reaction, heated to 150~400° C,the pressure of 0.5 Mpa~4.5 Mpa, insulation 1 to 5 hours; a reaction product is filtered, washed with acidic liquid and dried to obtain green filter cake which is high purity chromium compound, calcined at 500~1200° C. and transformed into nano-chromium oxide solid.

4. The preparation method of claim 3, wherein the reducing agent is methanol, ethanol and straw or two of the above mixture.

5. The preparation method of claim 3, wherein an oxidizing agent is selected from the group consisting of oxygen, air, hydrogen peroxide, ozone or sulfuric acid radicals.

6. The preparation method of claim 4, wherein an oxidizing agent is selected from the group consisting of oxygen, air, hydrogen peroxide, ozone or sulfuric acid radicals.

7. The preparation method of claim 3, wherein the hydrating agent is selected from oxalic acid, cellulose, methanol, formaldehyde, formic acid, ethanol or glucose.

\* \* \* \* \*